United States Patent
Gray et al.

(10) Patent No.: US 10,466,955 B1
(45) Date of Patent: Nov. 5, 2019

(54) CROWDSOURCED AUDIO NORMALIZATION FOR PRESENTING MEDIA CONTENT

(71) Applicant: A9.com, Inc., Palo Alto, CA (US)

(72) Inventors: Douglas Ryan Gray, Redwood City, CA (US); Colin Jon Taylor, Orinda, CA (US); Ming Du, Redwood City, CA (US); Wei-Hong Chuang, Burlingame, CA (US)

(73) Assignee: A9.COM, INC., Palo Alto, CA (US)

( * ) Notice: Subject to any disclaimer, the term of this patent is extended or adjusted under 35 U.S.C. 154(b) by 615 days.

(21) Appl. No.: 14/313,773

(22) Filed: Jun. 24, 2014

(51) Int. Cl.
*G06F 3/16* (2006.01)

(52) U.S. Cl.
CPC .................. *G06F 3/165* (2013.01)

(58) Field of Classification Search
CPC ... G06F 17/30867; G10H 1/46; G10L 21/034; G10L 21/0364; H03G 3/20; H03G 3/3005; H03G 3/32; H03G 5/16; H03G 5/165; H03G 7/002; H03G 7/007; H03G 9/025; H04L 65/4069; H04L 65/4084; H04L 67/22; H04L 67/306; H04N 5/60; H04N 21/439; H04N 21/4394; H04R 1/1041; H04R 3/00; H04R 25/70; H04R 2430/03; H04R 2499/11; H04S 2400/13
USPC ............. 381/56, 105, 107; 455/403; 700/94; 704/203, 205, 224–228

See application file for complete search history.

(56) References Cited

U.S. PATENT DOCUMENTS

| | | | | |
|---|---|---|---|---|
| 2006/0221257 A1* | 10/2006 | Nakayama | ......... | H04N 5/44513 348/738 |
| 2006/0291816 A1* | 12/2006 | Ozawa | ............... | G06K 9/00234 386/248 |
| 2014/0309549 A1* | 10/2014 | Selig | .................... | H04R 1/1041 600/559 |
| 2015/0146886 A1* | 5/2015 | Baumgarte | .............. | H03G 3/02 381/107 |

* cited by examiner

*Primary Examiner* — Duc Nguyen
*Assistant Examiner* — Alexander L Eljaiek
(74) *Attorney, Agent, or Firm* — Hogan Lovells US, LLP (57) ABSTRACT

Various embodiments provide methods and systems for providing a recommended volume level in presentation of media content. In some embodiments, volume adjustment events made by a user and/or similar users while watching media content can be detected and automatically recorded. The media content may include a plurality of segments. A normalized volume level for at least one segment of the media content can be determined by aggregating the recorded volume adjustment events corresponding to the at least one segment of the media content. When the media content is played back on a user device, at least some embodiments cause the at least one segment of the media content to be played back at a recommended volume level determined based at least in part upon one of the normalized audio level of the corresponding segment, the audio system of the user device, or historical data and personal profile of the user.

11 Claims, 7 Drawing Sheets

CROWDSOURCED AUDIO NORMALIZATION FOR PRESENTING MEDIA CONTENT

BACKGROUND

The World Wide Web, Wideband, and Internet, and other technology developments have made it possible for users to watch streaming videos via computers, cable set-top boxes, satellite receivers, and televisions. A user's quality experience of watching streaming video depends on many factors. For example, factors that influence user experience include the quality of audio/video presented, the bandwidth of Internet access, the time to reach a stable video quality level etc.

It often is the case, however, that the user experience is negatively impacted by the way the audio is actually designed or encoded. For example, a movie that a user is streaming might include an audio track that was designed to be presented in theaters, and thus may not be optimal for one or two speakers of, for example, a mobile device. The default audio levels can vary, such that the sound may be too loud in some places and too low in others for a user watching the videos in a private venue. Further, the appropriateness of levels can vary by user as well. Unfortunately, users of conventional devices are typically stuck with constantly adjusting the volume or settling on an audio volume that is less than optimal for that user.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome deficiencies in conventional approaches of presenting media content (e.g., a video or game) to users. More specifically, various embodiments of the present disclosure provide a user personalized audio experience in watching media content by enabling the user to select an automatic audio adjustment feature while watching the media content. In some embodiments, volume adjustments made by users while watching media content can be detected and automatically recorded. The media content may include a plurality of segments. A normalized volume level for each segment of the media content can be determined by aggregating the recorded volume adjustment events within the corresponding segment of the media content. When the media content is played back on a user device, historical data and personal profile of the user can be analyzed and used to determine a recommended volume level rendering on the user device. At least some embodiments enable a user to select a recommended audio feature that causes each segment of the media content to be played back at a volume level determined based at least in part upon one of the normalized volume level of the corresponding segment, the audio system of the user device, or historical data and personal profile of the user.

In some embodiments, the recommended volume levels provided for media content may be dynamically normalized by monitoring and analyzing audio adjustments to the streaming media content and/or similar media content made by the user and/or a group of users.

In some embodiments, volume adjustments made by users while watching media content can be extracted from volume adjustment events from user devices. The volume adjustment events include recordings or logs of user activities on user devices during the presentation of the media content. Each volume adjustment event or log file includes a timestamp, and/or information about the nature of the device activity.

Many embodiments provide segmentation of media content by analyzing the media content according to various visual and/or audio algorithms (e.g., face detection, emotional detection, motion detection and semantic analysis algorithms). In some embodiments, various superhistograms, frame signatures, cut detection methods and closed caption information can also be used to identify segments within media content. For example, the visual information can be analyzed for changes in color, edge and shape to determine changes of individuals and key frames. In another example, closed captioning information can be analyzed for identifying segments of the media content. In some instances, media content can be segmented in a fixed time interval (e.g., every 10 seconds), or sometime can be identified manually.

Various other functions and advantages are described and suggested below as may be provided in accordance with the various embodiments.

Figure 1:
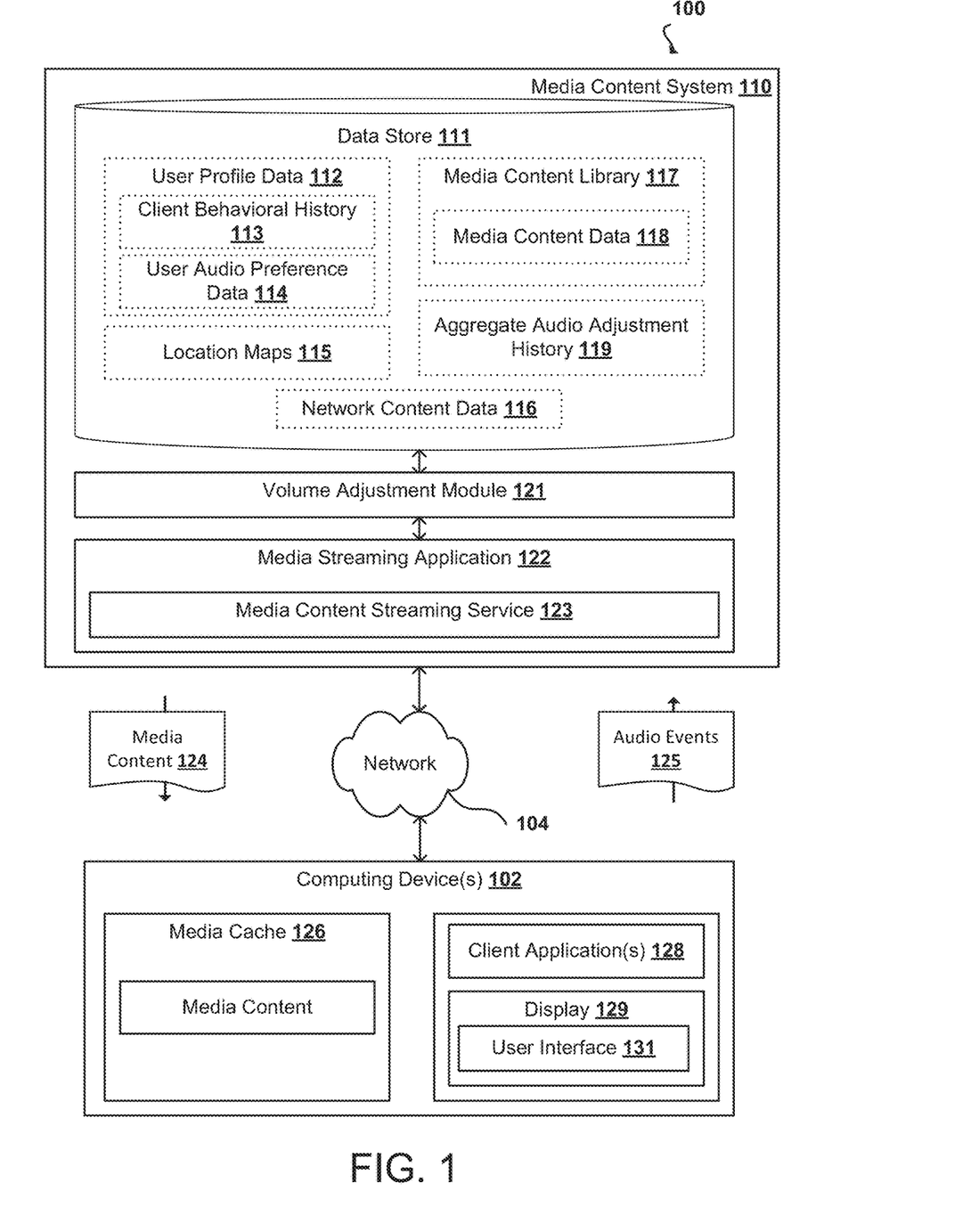
FIG. 1 illustrates an example system for providing a normalized audio level for users to select in accordance with various embodiments.

FIG. 1 illustrates an example system 100 for providing a normalized audio level for users to select in accordance with various embodiments. In this example, example system 100 includes a Media Content System 110. The Media Content System 110 communicates with the client computing devices 102 via the network 104. Although only a client computing device 102 is shown in FIG. 1, it should be understood that various other types of electronic or computing device that capable of receiving, displaying or playing media content in accordance with various embodiments discussed herein. These client devices can include, for example desktop PCs, laptop computers, tablet computers, personal data assistants (PDAs), smart phones, portable media content players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, or a combination of any two or more of these.

The Media Content System 110 may comprise, for example, a server computer or any other system providing computing capability. Alternatively, the Media Content System 110 may employ a plurality of computing devices that are arranged, for example, in one or more server banks or computer banks or other arrangements. Such computing devices may be located in a single installation or may be distributed among many different geographical locations. For example, the Media Content System 110 may include a plurality of computing devices that together may comprise a computing resource, a grid computing resource, and/or any other distributed computing arrangement. In some cases, the Media Content System 110 may correspond to an elastic computing resource where the allotted capacity of processing, network, storage, or other computing-related resources may vary over time.

Various applications and/or other functionality may be executed in the Media Content System 110 according to various embodiments. Also, various data is stored in a Data Store 111 that is accessible to the Media Content System 110. The Data Store 111 may be representative of a plurality of data stores 111 as can be appreciated. The data stored in the Data Store 111, for example, is associated with the operation of the various applications and/or functional entities described below.

The components executed on the Media Content System 110, for example, include a Media Streaming Application 122 that includes media content Streaming Service 123. A Volume Adjustment Module 121 may be configured to adjust volume level of a streaming media based at least upon data stored in the data store 111. In addition, other applications, services, processes, systems, engines, or functionality may be implemented on the Media Content System 110 that is not discussed in detail herein. The Media Streaming Application 122 is executed to facilitate the creation of media content streaming event, the streaming of media content, interaction during media content streaming event and potentially other functions. The Media Streaming Application 122 may also serve up network content, such as webpages or other network content that is encoded for rendering by Computing device(s) 102.

The data stored in the Data Store 111 includes, for example, User Profile Data 112, Location Maps 115, Media Content Library 117, Aggregate Audio Adjustment History 119, Network Content Data 116, and potentially other data. The User Profile Data 112 may include profile data relating to a user and/or Computing device(s) 102 associated with the user. The User Profile Data 112 may include User Audio Preference Data 114, Client Behavioral History 113, and/or other information.

The User Audio Preference Data 114 may include data related to audio preference associated with the user. The Client Behavioral History 113 may include data with respect to prior locations, and time associated with user with respect to prior downloads and/or consumption of media content over a Network 104. As such, the Client Behavioral History 113 may be able to reflect particular habits related to the user. If the user employs multiple Computing device(s) 102, multiple location-dependent profiles may be created for Computing device(s) 102 that are mobile devices.

The Location Maps 115 may include various maps and coordinates associated with various regions worldwide. The Location Maps 115 may be used in evaluating User Profile Data 112. Media Content Library 117 may comprise Media Content Data 118. The Media Content Data 118 comprises data that makes up media content item including for example, movies, television shows, video clips, music, and/or other forms of media content. The Media Content 124 transmitted to the Computing Device 102 for caching in the Media Cache 126 is selected from the Media Content Data 118. The Media Content 124 may comprise one or more media content items and/or a portion of media content item. The Volume Adjustment Module 121 may use Aggregate Audio Adjustment History 119 to determine whether volume level should be adjusted as the content is rendered by the computing device 102.

Network Content Data 116 may include images, text, code, graphics, audio, video, and/or other content that may be served by the Media Streaming Application 122. To this end, Network Content Data 116 may include static network content or static elements of network content, for example, in hypertext markup language (HTML), extensible markup language (XML), and/or any other language suitable for creating network content. Further Network Content Data 116 may include code that generates dynamic network pages when executed or interpreted in the Media Content System 110. Such code may be written in any suitable programming language, such as PHP, Perl, Objective C, Java, Ruby, etc. Network Content Data 116 may also include code configured to be executed or interpreted within a Computing Device 102 in order to render a dynamic network content. Such code may be referred to as applets and may be written in any suitable programming language, such as JavaScript, Java, etc.

The Computing Device 102 may be configured to execute various applications such as a Client Application 128 and/or other applications. Also, various data is stored in the Media Cache 126 that is accessible to the Computing Device 102. The data stored in the Media Cache 126, for example, is associated with the operation of the various applications and/or functional entities described below.

The Client Application 128 may be executed in a Computing Device 102, for example, to access network content served by the Media Content System 110 and/or other servers, thereby rendering a User Interface 131 on the Display 129. The Client Application 128 may, for example, correspond to a browser, a mobile application, media player application, etc., and the User Interface 131 may correspond to a network page, a mobile application screen, etc. The Computing Device 102 may be configured to execute applications beyond the Client Application 128 such as, for example, mobile applications, email applications, social networking applications, and/or other applications.

The data stored in the Media Cache 126 includes, for example, Media Content 124, and potentially other data. The Media Content 124 may include one or more media content items and/or a portion of media content item that has been streamed to the Computing Device 102 via the Media Content Streaming Service 123 prior to playback on the client device 102. For example, when streaming media content, the Media Content Streaming Service 123 may provide additional Media Content 124 other than what is needed for instantaneous playback. As such, the Media Content 124 received by the Computing Device 102 but not currently being consumed may be stored in the Media Cache 126 prior to playback. Additionally, the Media Content 124 being transmitted to the Computing Device 102 may be an single media content item such as, for example, a song, or may be portion of media content item such as, for example, a portion of a movie.

Additionally, the Computing Device 102 may be configured to transmit Audio Events 125 to the Media Content System 110. The Audio Events 125 may include current volume level and volume change events relating to the streaming content, and various information relating to current location of the client, and/or any other information related to the network access of the Computing Device 102.

In various embodiments, a user may access a Media Streaming Application 122 via a User Interface 131 rendered by a Computing Device 102 associated with the user. The user may request to stream media content. Accordingly, an appropriate amount of the Media Content 124 may be transmitted for caching on the Computing Device 102 prior to playback. In some embodiments, the amount of media content 124 cached on the computing device 102 is determined at least upon a location associated with the client device 102 requesting media content stream or User Audio Preference Data 114 from the Computing Device 102. Various techniques can be used to cache media content on a computing device. Some techniques are described in co-pending U.S. patent application Ser. No. 13/887,579, filed May 6, 2013, entitled "Dynamically Adjusting Queue Length of Streamed Content Based on WAN coverage for Predicted Route," which is hereby incorporated herein by references in its entirety.

The Media Content System 110 can be configured to monitor volume adjustment events (e.g., audio level adjustments) with timestamps on client devices while media contents (e.g., a video or game) being displayed on the client devices. In some embodiments, while the movie is playing and a user adjusts volume up or down on a client device, the client device may recognize the volume adjustment and associate the event with a timestamp. Then, the client device may transmit the event to the Media Content System 110 and cause the event to be recorded in a data store 111. In some implementations, the client device may log these volume adjustment events in a file and periodically sends the file to the Media Content System 110. In some embodiments, recorded audio volume levels for each segment of media content can be aggregated when above a predetermined number of users have made audio adjustments to a specific segment of the streaming media content. Aggregated volume levels of a specific segment of streaming media content can be normalized and used to provide an automatic audio adjustment feature for a viewer of the media content. The specific segment of the streaming media content can be defined in any period of time (e.g., 5 seconds, 1 minute, or a customized time period) or an entire scene of the media content.

In some embodiments, a user may be associated with a user segment (e.g., New Mom, Gadget Geek, or Book Lover) based at least in part upon the user profile or an audio system profile of the client device. The user profile can include viewing history, purchase and rental history, volume adjustments, user preference, historical data, and user demographic data. In some embodiments, the user may be able to select a personalized automatic adjustment feature that is tailored to the user's preference in watching the media content and/or based on a user segment associated with the user. For example, a user is associated with a Gadget Geek category. An audio adjustment for a particular scene in a movie may be recommended or automatically provided to the user based upon what other Gadget Geeks have done about adjusting volume for the particular scene. In some embodiments, the audio system profile of the client device can be provided by the user or extracted from a request for media content(s) from the client device. For example, a user has multiple user devices, each of which may be associated with a different audio system profile.

Some embodiments analyze semantic information of media content to identify a plurality of segments (e.g., scenes or shots) in the media content, and/or one or more sub-segments within each of the plurality of segments. In some embodiments, a plurality of segments in media content can be identified manually. Automatically adjusted audio level may be kept substantially constant within each segment of the media content. In some embodiments, speech recognition is used to automatically identify segments within media content. For example, speech recognition can be used to identify dialogue segments from action segments. Segments of media content can be identified by analyzing semantic information of the media content according to a predetermined speech recognition algorithm.

In some embodiments, face detection and emotion detection algorithms can also be used to analyze the content of media contents. For example, if a person displayed on the screen of a user device looks deep in thoughts, the automatic audio adjustment feature may tune the volume accordingly rather than a full blast audio mode. In some embodiments, face detection, emotion detection and motion detection algorithms may be combined to identify segments of media content (e.g., a streaming video or game). Various techniques can be used as the face detection and emotion detection technique or to enhance other processes. Some techniques are described in co-pending U.S. patent application Ser. No. 12/332,049, filed Dec. 10, 2008, entitled "MOVEMENT RECOGNITION AS INPUT MECHANISM," co-pending U.S. patent application Ser. No. 12/786,297, filed May 24, 2010, entitled "DETERMINE RELATIVE MOTION AS INPUT," and co-pending U.S. patent application Ser. No. 13/718,649, filed Dec. 18, 2012, entitled "FRAUD DETECTION FOR FACIAL RECOGNITION SYSTEMS," which are hereby incorporated herein by references in their entirety.

The system 100 in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature and not limiting to the scope of the disclosure.

Figure 2A:
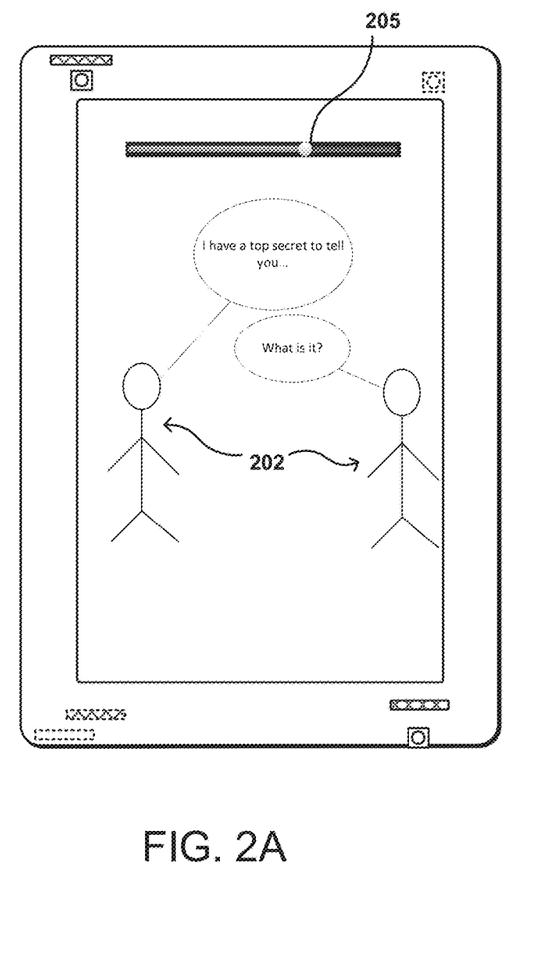
FIGS. 2A and 2B illustrate examples of normalized volume levels for users to select in accordance with various embodiments.
Figure 2B:
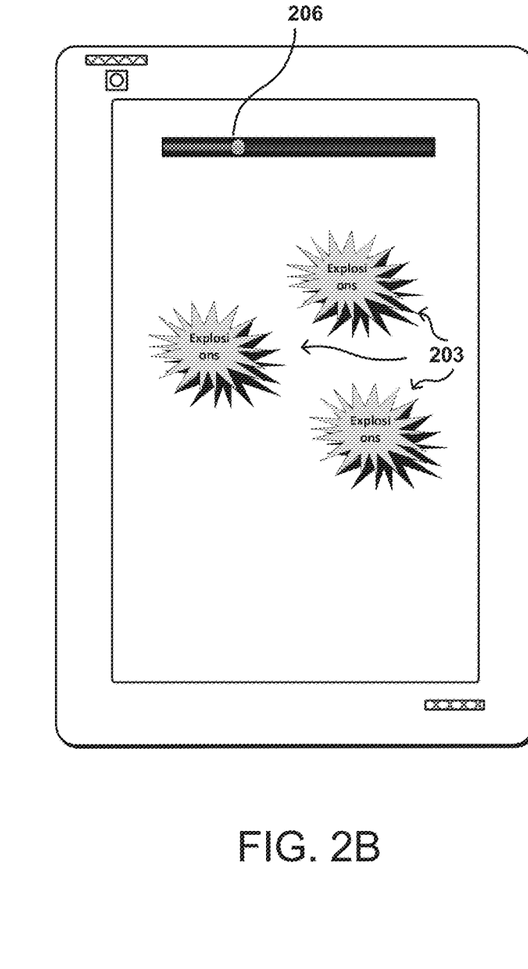

FIGS. 2A and 2B illustrate examples of normalized audio settings for users to select in accordance with various embodiments. As illustrated in FIG. 2A, the media system 110 may, in response to detecting a secretive conversation between individuals 202 displayed on a user device, cause the audio level (e.g., decibels) on the user device to be automatically increased to a higher level 205. In contrast, in response to action shots (e.g., explosions 203) is coming up, the Media Content System 110 may cause the audio level (e.g., decibels) to be automatically decreased to a lower level 206, which is illustrated in FIG. 2B. For example, if the media system 110 determines that a loud scene is coming and a user has turned the volume down in similar scenes or others like the user have turned the volume down, the media system 110 may cause the volume level on the user device to be automatically adjusted lower, or send a lower volume control to the user device for the user to adjust manually (e.g., reflected by adjusting a volume scrubber bar). In some embodiments, the Media Content System 110 may cause the audio level on the user device to be automatically adjusted based at least in part upon one of the normalized audio setting of the corresponding segment, or historical data and personal profile of the user.

In at least some embodiments, in addition to causing the audio level on user devices being automatically adjusted, the Media Content System 110 may also cause subtitles to be provided for a user to select when watching a streaming video or game. In many instances, subtitles can be automatically presented to a user or provided for a user to select when the dialogues of a streaming video or game are difficult to be understood or spoken in a foreign language. In some embodiments, automated language recognition and/or translation can be used to analyze videos or games being streamed to user devices. Subtitles can be automatically presented on user devices or enabled for a user to select when the dialogues of a streaming video or game are in foreign languages. In some embodiments, subtitles can be automatically presented on the screen of a user device when the user has muted the audio signal or the audio quality of a streaming video or game is low.

In some other embodiments, the Media Content System 110 can cause the audio level on user devices to be automatically adjusted based at least in part upon historical user data on one or more similar videos or games. For example, a user has watched episodes 1-3 of the first season of a television program that contains 5 episodes, and now the user is beginning to view episode 4. Any audio adjustments made by the user while viewing episodes 1-3 were logged and stored in the Data Store. This data may be used to predict audio adjustments that user will make while viewing episode 4. For example, if the user adjusted the volume lower while watching car chase scenes in episodes 1 to 3, and episode 4 contains a car chase scene, the system may predict that the user will lower the volume during that portion of episode 4. Thus, the system will provide audio adjustment controls to the client device associate with the car chase scene in episode 4 such that the client device will automatically adjust the volume lower during that portion of episode 4. The normalized audio level provided in an automatic audio adjustment feature can be generated ahead of time based at least upon normalized audio volume level in similar videos or games. In some instances, the audio level provided in an automatic audio adjustment feature for a video or game can be dynamically normalized based at least in part upon a combination of historical user data on the similar videos or games and aggregated user adjustment data related to the instant video or game.

Various embodiments provide personalized audio adjustment based on the profile of each individual user, the listening behavior of "similar" users, the aggregate listening behavior of a group of users or any combination thereof. A user profile may include content viewed or purchased by the user, user preference in watching a video or game, demographic data, or any registered client devices, and the like. Demographic data of a user includes one or more of user age, user gender, postal code, and the like. The audio system of the user device may include one or more of headphones (e.g., earphones, ear buds, and the like), speakers (e.g, tablet speakers, blue tooth speakers, computer speakers, bookshelf speakers, center-channel speakers, floor speakers, in-wall and in-ceiling speakers, outdoor speakers, sound bars, portable speakers, and woofer/sub-woofer speakers), or various types of audio amplifiers. In some embodiments, the Media Content System 110 can automatically detect the audio system on a user device and cause the normalized audio signal of a video or game to be played on the user device based at least in part upon the detected audio system of the user device.

For example, if the audio system has a center speaker, a woofer speaker, left and right front speakers, and left and right rear speakers. The center speaker may outputs clean dialogues, the woofer speaker outputs mid-bass sound, the left and right front speakers output a variety of sound effects, and the left and right rear speakers output additional effect sounds, surrounding sound, and background sound respect to the sounds from other speakers.

In some embodiments, users can be classified into a plurality of user segments based upon viewing history, purchase and rental history, volume adjustments, user preference, historical data, and user demographic data. Normalized volume level of a streaming video or game can be provided to a user based on the specific user segment that the user belongs to. For example, Action Movie watchers typically raise the volume in action scenes. For a user associated with the Action Movie segment, a raised volume level or a recommendation to raise the volume may be provided for action scenes. In some embodiments, different volume levels may be automatically adjusted for users associated with different user segments.

In some embodiments, the Media Content System 110 may also provide an audio enhancement mode. In the audio enhancement mode, the Media Content System 110 can cause the audio signal on a user device to be played at certain particular frequencies to accommodate hearing need for a specific user segment or a specific user. For example, a specific user segment or a specific user may need hearing aid to watch a regular video or game. The audio enhancement mode may cause the audio setting to be automatically adjusted (e.g., by automatically adjusting equalizer and volume settings) and enable a specific user to watch a streaming video or game without any hearing aid. In some instances, the Media Content System 110 may cause subtitles to be automatically rendered on user devices.

Some embodiments may provide a slide bar option for a user to configure the audio signal of a streaming video or game. A user may use the slide bar option to respectively adjust the sound volumes of fundamental and harmonic components of the audio signal. In some instances, a speech augmentation mode may be provided for a user to control the dialogues and background sounds. For example, a user is able to attenuate everything other than dialogues by emphasizing on that track. Or the user may choose to mute the dialogues and only listen to the background sounds. In some embodiments, an automatic audio adjustment system may provide the normalized audio signal in a separate track for users to select and parse.

In some embodiments, the audio signal of a streaming video or game can be categorized into different types (e.g., multiplexing, direct stream digital and pulse code modulation) based on one or more predetermined algorithms. Depending on the types of audio signals, different types of automatic audio adjustment features may be provided for a user to select. For example, two or more slide bars may be provided for a user to control multiplexing audio signal with different tracks, with at least one slide bar for gain control and at least another slide bar for balancing control. In some embodiments, the Media Content System 110 may cause the streaming video or game to be played at a volume no more than a decibel cap on a user device. The decibel cap may be personalized based at least upon the profile of the user, or the audio system of the user device. In some instances, in response to a user plugging or unplugging an earphone, the Media Content System 110 may cause the audio level on the user device to be dynamically adjusted to accommodate audio system changes on the user end.

Various other types of methods to provide an automatic audio adjustment feature for streaming media contents are also possible, some of which are discussed in further detail elsewhere herein.

Figure 3:
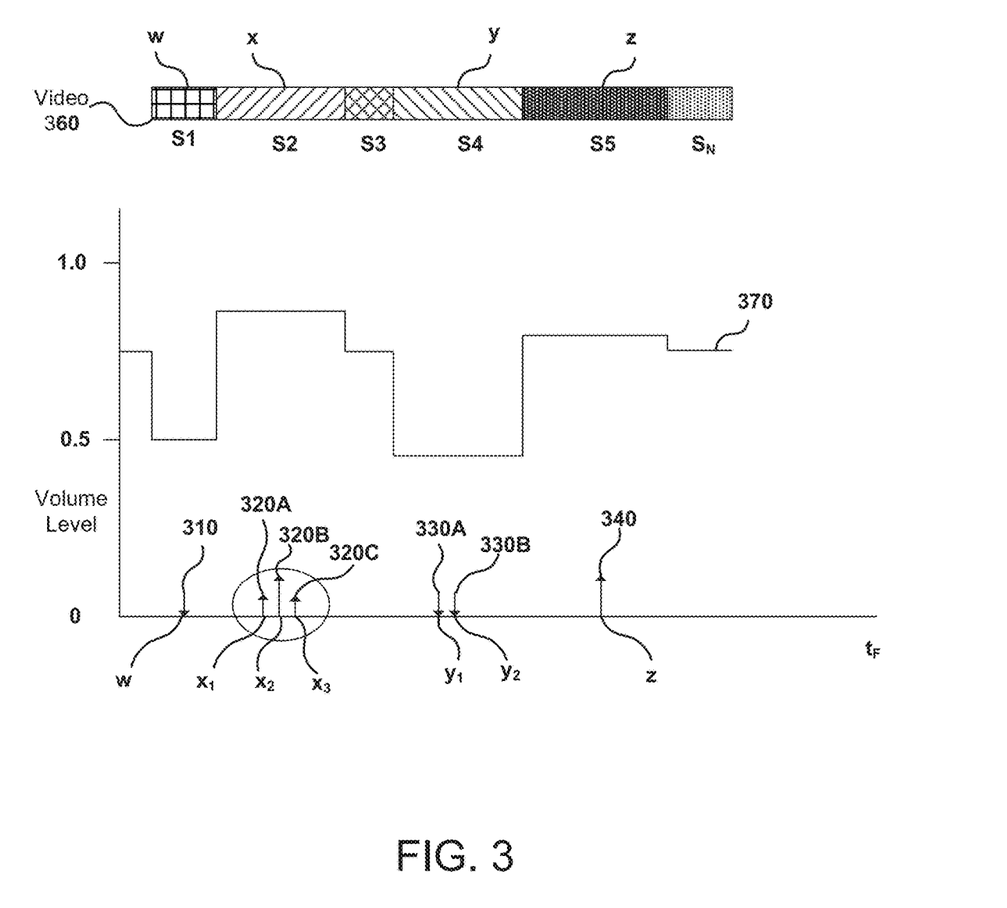
FIG. 3 illustrates an example for providing a recommended volume level for users to select in accordance with various embodiments.

FIG. 3 illustrates an example of providing a recommended volume level for users to select in accordance with various embodiments. In this example, while media content is being played on user devices, volume adjustment events with timestamps can be detected and recorded. For example, the adjustment events may include volume adjustment event 310 at time w, volume adjustment events 320A, 320B and 320C at time $x_1$, $x_2$ and $x_3$, respectively, volume adjustment events 330A and 330B at time y1 and y2, respectively, and volume adjustment event 340 at time z. Each volume adjustment event corresponds to a piece of content (e.g., movie), which can be segmented into scenes S1-$S_N$ (represented by a video 360 log). These volume adjustment events can be aggregated and normalized by the Aggregate Audio Adjustment History Module.

Volume adjustment events within a video 360 can be recorded. Volume adjustment events occurred within a video segmentation or close in time (e.g., within a scene) can be determined, aggregated and then normalized. For example, the volume adjustment events 320A, 320B and 320C, within the video segment that circumscribes the times $x_1$, $x_2$ and $x_3$, can be aggregated and normalized. Similar aggregation and normalization can also be performed to other volume adjustment events (e.g., 310, 330A, 330B, and 340). In some embodiments, volume adjustment events that are close in time within a threshold time period can be aggregated and normalized. When the media content is played back on a user device, the recommended volume level 370 can be provided so that the user device can automatically adjust the audio volume. In this example, volume levels within a video 360 may vary between 0 and 1. The default volume level of a new segmentation of the video 360 may be 0.75. However, the recommended volume level 370 for each segmentation or piece of content being played can be determined based on what the user has done in the past, which may vary between 0 and 1. In some embodiments, the recommended volume level 370 for each segmentation or piece of content being played at least in part based upon what the user and/or "similar" users have done for same or similar scenes in the past. The user can adjust the volume level of any segmentation of the video 360 through a client's user interface (UI) (e.g., a volume slide bar).

In some embodiments, users can be associated with one or more user segments (e.g., crash junky, loud listener, etc.) based at least in part upon the types of movies previously purchased or viewed, the prior volume adjustments while watching a movie, a user profile, past purchases and the like. Some embodiments provide various algorithms to smooth the normalized volume level between adjacent segments in media content. In some embodiments, ambient noise level collected by a user device may also be collected and analyzed. The recommended volume level 370 provided to the user device may be determined based at least in part upon the ambient noise level of the user device.

Figure 4A:
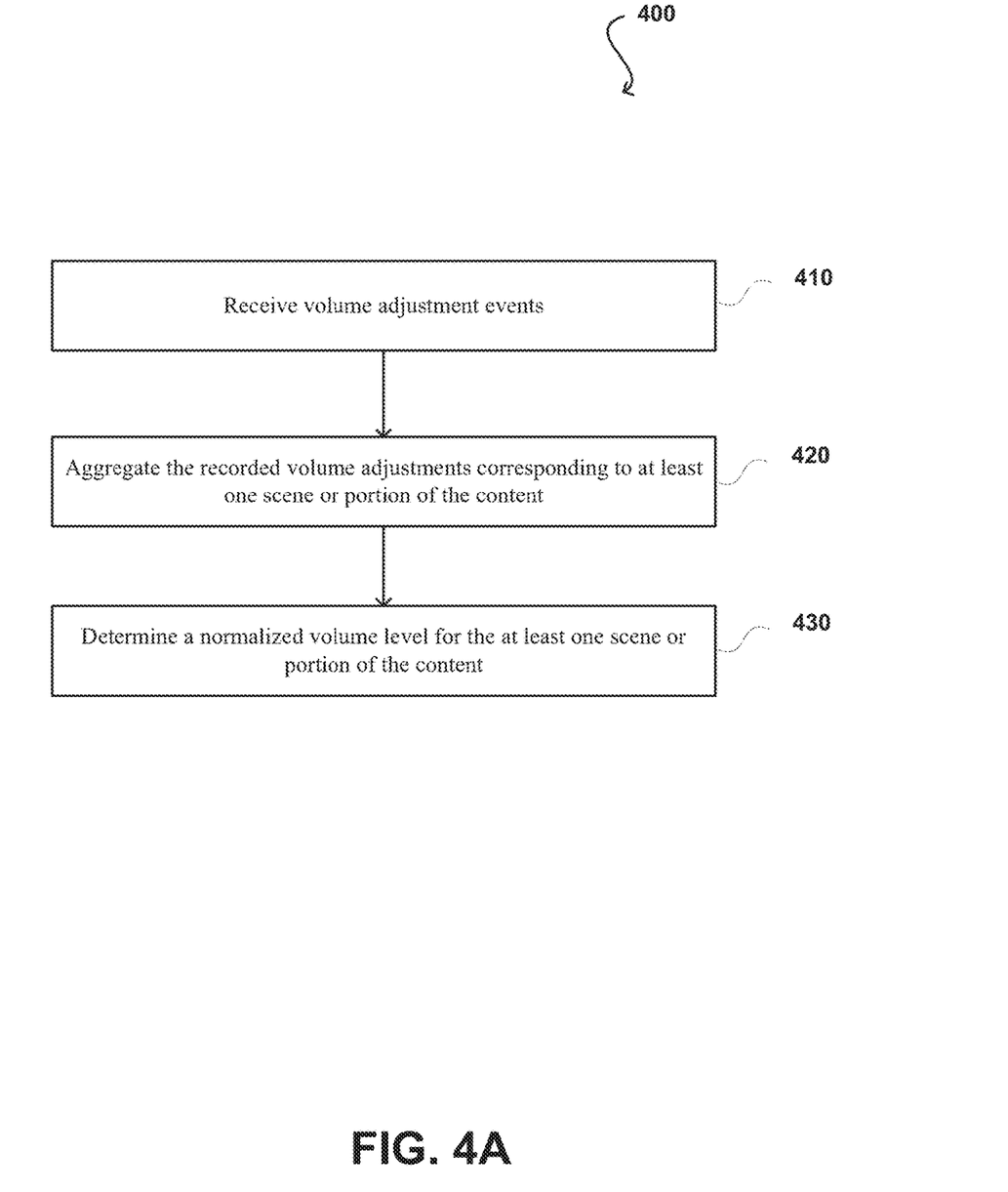
FIGS. 4A and 4B illustrate example processes for providing an automated volume level for users to select in accordance with various embodiments.
Figure 4B:
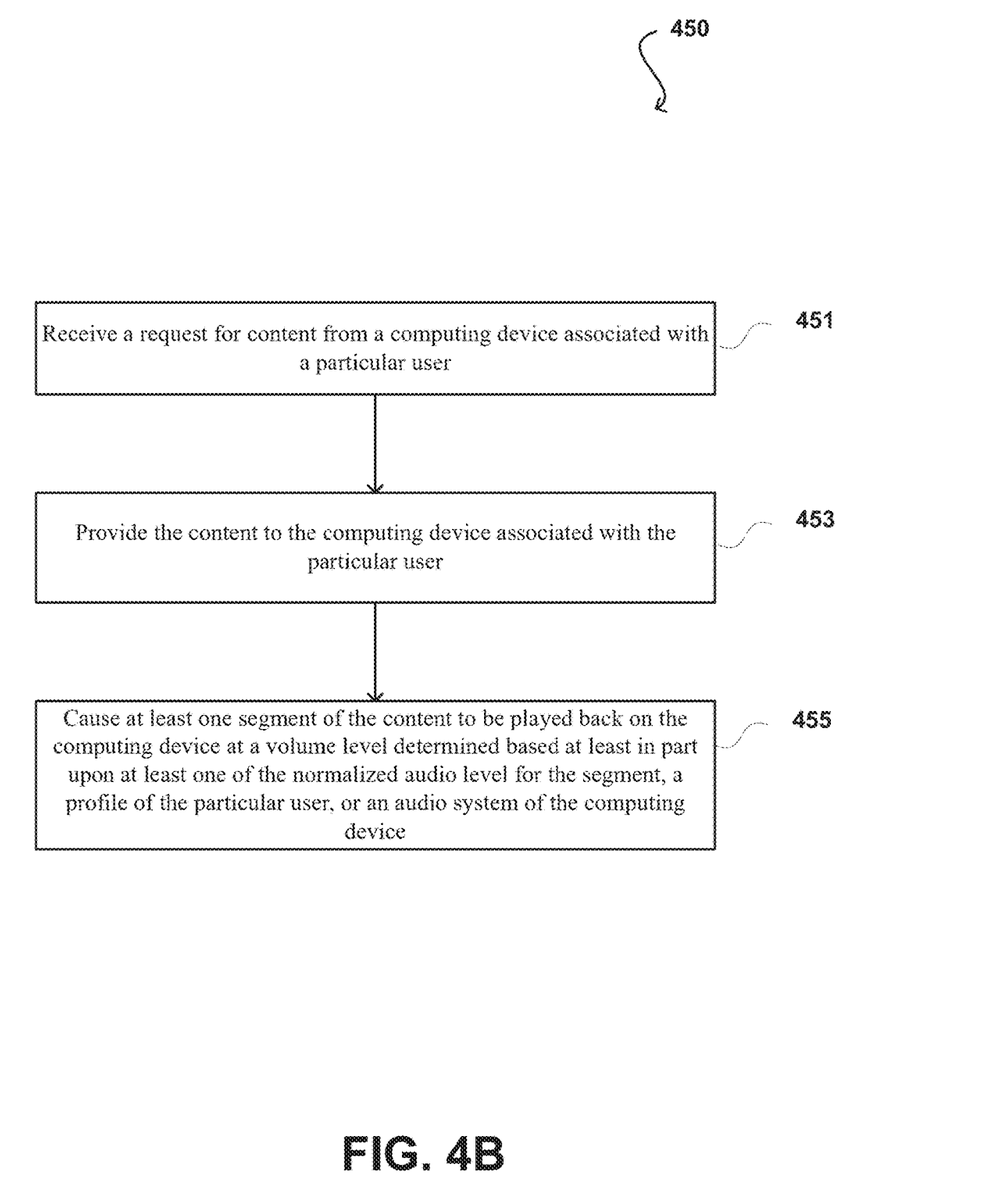

FIGS. 4A and 4B illustrate example processes for providing an automated volume level for users to select in accordance with various embodiments. The processes 400 and 450, or any other process described herein or variations and combinations thereof, may be performed on a computing device, such as a smartphone, tablet computer, wearable computers (e.g., watches or glasses), gaming consoles, or any device capable of providing, receiving, displaying or playing streaming media contents in accordance with various embodiments discussed herein. By way of examples, the devices can include a laptop computer, a portable media player, an e-book reader, a personal digital assistant (PDA), a portable computer, a tablet PC, a head-mounted display, a wearable computer, an interactive kiosk, a mobile phone, a gaming console, a home-theater PC (HTPC), a TV, a DVD player, a digital cable box, a digital video recorder (DVR), a single-board computer (SBC), an embedded computer system, a wearable computer (e.g., a watch or glasses), or a combination of two or more of these.

In FIG. 4A, the process 400 begins by receiving volume adjustment events from one or more computing devices, at step 410. The volume adjustments were made by one or more users while content being presented on computing devices of the one or more users. In some embodiments, the content can be automatically or manually analyzed to identify a plurality of scenes within the content. Volume adjustment events occurred within at least one scene or portion of the content can be determined by comparing time stamps of the volume adjustments and the plurality of predetermined scenes of the corresponding content. The recorded volume adjustments corresponding to at least one scene or portion of the content can be aggregated, at step 420. In some embodiments, the volume adjustments corresponding to the at least one scene or portion of the content are normalized based at least upon past behavior of a specific user and/or past behavior of a specific user segment. A normalized volume level for at least one portion of the content can be determined based at least in part upon the aggregated volume adjustments within the corresponding portion of the content, at step 430. The portion of the content could be a scene, portion of a scene, or any period of time, etc.

In FIG. 4B, the process 450 begins by receiving a request for content from a computing device associated with a particular user, at step 451. In response to receiving the request, a server system can cause the content to be presented on the computing device associated with the particular user, at step 453. In some embodiments, a user profile corresponding to the particular user can be determined. Some embodiments may cause each segment of the content to be played back at a volume level determined based at least in part upon at least one of the normalized audio level for the segment, a user profile of the particular user, or an audio system of the computing device, at step 455. For example, the automatic audio adjustment provided to the computing device may be personalized by analyzing volume adjustments made by "similar" users, or users with similar computing devices or audio systems.

Figure 5:
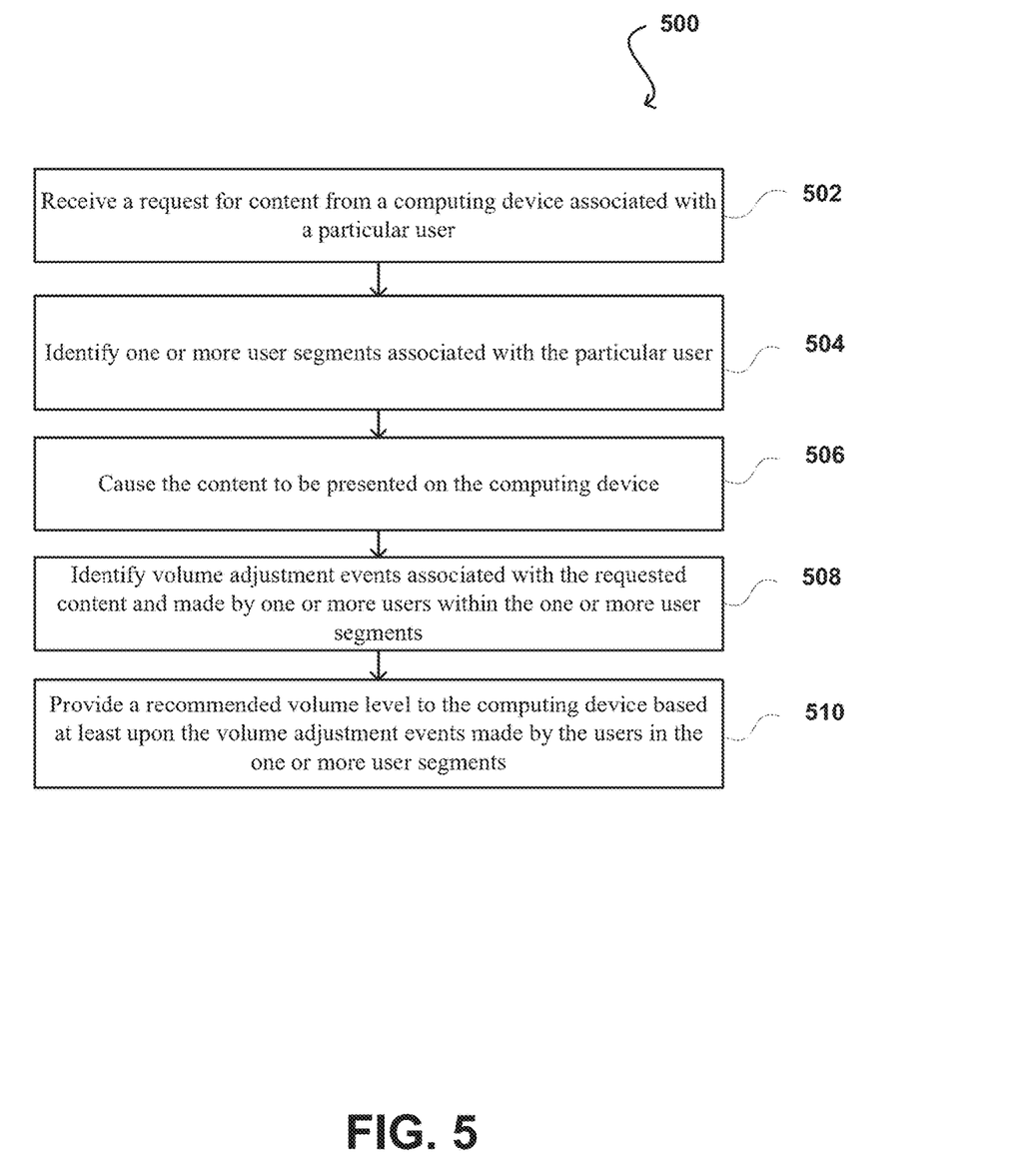
FIG. 5 illustrates another example process for providing an automated volume level for users to select in accordance with various embodiments.

FIG. 5 illustrates another example process 500 for providing an automated volume level for users to select in accordance with various embodiments. In this example, the automatic volume adjustment process 500 begins by receiving a request for media content from a computing device associated with a particular user, at step 502. One or more user segments associated with the particular user can be determined, at step 504. In some embodiments, users can be classified into a plurality of user segments depending on their likelihood of selecting a specific audio setting. In some embodiments, users can be classified based at least in part upon one or more of demographic characteristics, or audio systems of the computing devices. For example, Classical Music listeners may be classified into a user segment of the Classical Music listeners. In response to detecting an action scene and a determination that the particular user belongs to the user segment of the Classical Music listeners, a lower volume level may be provided for the particular user on the computing device. In some embodiments, the Media Content System may also determine the particular user's listening habits, similar users' listening habits, or users using similar computing device(s).

At step 506, in response to receiving the request, the content can be provided to the computing device for rendering to the particular user. Volume adjustment events that are associated with the requested content and were made by one or more users within the one or more user segments, can be identified at step 508. A recommended volume level can be provided to the computing device based at least upon the volume adjustment events made by the one or more users of the one or more user segments, at step 510. If the particular has not seen the content in the past, volume adjustment events made by the one or more users of the one or more user segments can be aggregated and used to determine the recommended volume level for the particular user. In some embodiments, a recommended volume level may be determined based at least upon volume adjustment events made by the particular user while watching similar content, volume adjustment events made by users watching the content on similar computing devices, or volume adjustment events made by users with similar habits in watching the content.

Many embodiments provide an automatic volume adjustment feature while presenting content on a computing device. In some instances, a recommended volume level can be generated based on crowdsourced volume adjustment data of similar content. Recorded volume adjustment events from viewers of the similar content can be used to train an automatic volume adjustment algorithm for causing volume levels of a new content to be automatically adjusted. In some embodiments, automatic volume levels of new content can be dynamically normalized based at least in part upon volume adjustment events on the new content together with volume adjustment events on similar content. As would be appreciated by one of ordinary skill in the art, various other options to provide recommended volume levels to users exist in accordance with various embodiments of the present disclosure.

Figure 6A:
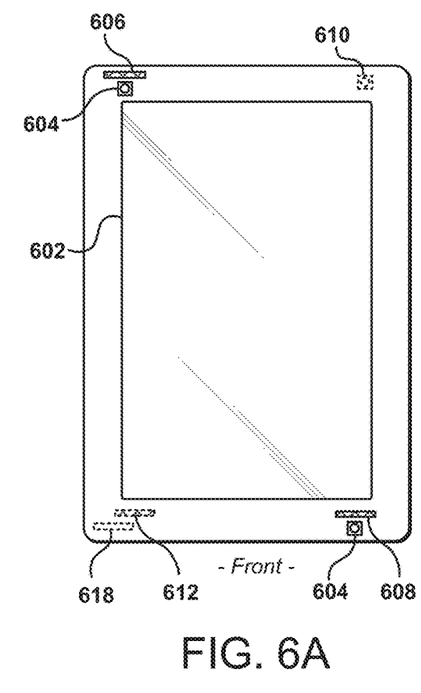
FIGS. 6A and 6B illustrates an example computing device that can be used to implement aspects of the various embodiments.
Figure 6B:
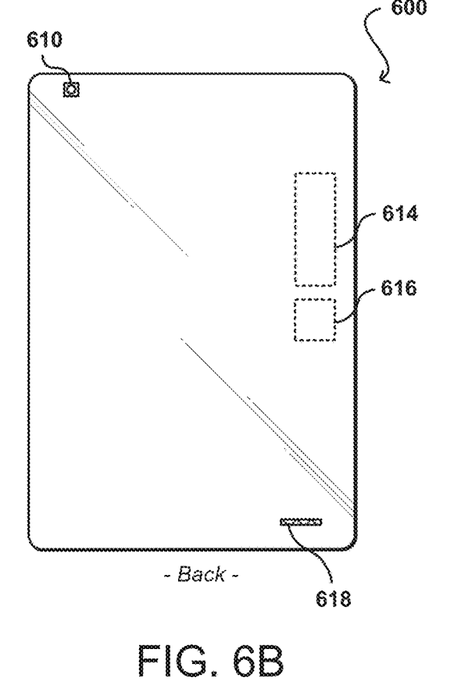

FIGS. 6A and 6B illustrate front and back views, respectively, of an example electronic computing device 600 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices are capable of receiving, displaying or playing streaming media content in accordance with various embodiments discussed herein. The devices can include, for example, desktop PCs, laptop computers, tablet computers, personal data assistants (PDAs), smart phones, portable media players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, among others.

In this example, the computing device 600 has a display screen 602 (e.g., an LCD element) operable to display information or image content to one or more users or viewers of the device. The display screen of some embodiments displays information (e.g., streaming media content) to the viewers facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled device (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display element of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These elements can include, for example, accelerometers, inertial sensors, electronic gyroscopes, and electronic compasses.

The example device also includes at least one computing mechanism 614, such as may include at least one wired or wireless component operable to communicate with one or more electronic devices. The device also includes a power system 616, such as may include a battery operable to be recharged through al plug-in approaches, or through other approaches such as capacitive charging through proximity with a power mat or other such device. Various other elements and/or combinations are possible as well within the scope of various embodiments.

Figure 7:
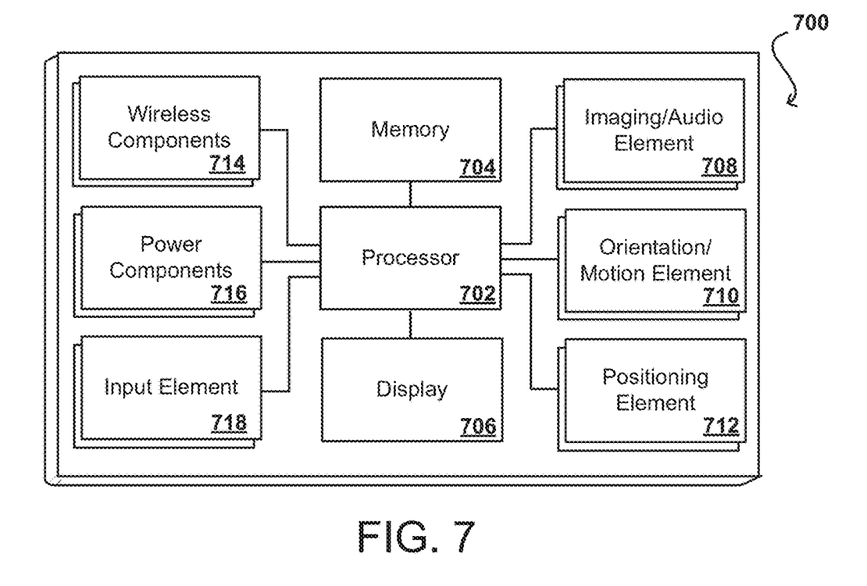
FIG. 7 illustrates example components of a computing device such as that illustrated in FIGS. 6A and 6B, in accordance with various embodiments.

FIG. 7 illustrates a set of basic components of an electronic computing device 700 such as the device 600 described with respect to FIG. 6. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of computing approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers. The display element 706 is capable of displaying streaming media content or other information to viewers facing the display element 706.

As discussed, the device in many embodiments will include at least one imaging/audio element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation/motion determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more al wired communications connections as known in the art.

The device also includes a power system 716, such as may include a battery operable to be recharged through al plug-in approaches, or through other approaches such as capacitive charging through proximity with a power mat or other such device. Various other elements and/or combinations are possible as well within the scope of various embodiments.

In some embodiments the device can include at least one additional input device 718 able to receive al input from a user. This al input can include, for example, a push button, touch pad, touch screen, wheel, joystick, keyboard, mouse, keypad, or any other such device or element whereby a user can input a command or a request for additional product information to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

The various embodiments can be further implemented in a wide variety of operating environments, which in some cases can include one or more user computers or computing devices which can be used to operate any of a number of applications. User or computing devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
at least one processor; and
memory including instructions that, when executed by the at least one processor, cause the at least one processor to:
  receive a request for electronic media content from a computing device associated with a particular user;
  transmit the requested electronic media content to the computing device associated with the particular user, the requested electronic media content being playable on the computing device;
  retrieve historical volume adjustments, made by one or more other users, that are associated with the requested electronic media, the historical volume adjustments being stored on the memory;
  parse the electronic media content into a plurality of segments based at least in part on an image recognition analysis of image data of the electronic media content, the plurality of segments including at least a first scene and a second scene, the first scene determined to correspond to a quiet scene based at least in part on the image recognition analysis of the image data and the second scene determined to correspond to an unquiet scene based at least in part on the image recognition analysis of the image data;
  generate a first normalized volume level for the first scene and a second normalized volume level for the second scene of the plurality of segments of the electronic media content by aggregating the historical volume adjustments in the corresponding segments when the historical volume adjustments include a number of volume adjustments to the first scene and to the second scene that are above a predetermined threshold;
  provide a first recommended volume level and a second recommended volume level to the computing device associated with the particular user, the first recommended volume level and the second recommended volume level determined based at least in part upon the first normalized volume level for the first scene and the second normalized volume level for the second scene, and further in part on historical volume adjustments, by the user, for content similar to the first scene and the second scene; and
  cause the first scene of the plurality of segments of the electronic media content to be played back at the first recommended volume level and the second scene of the plurality of segments of the electronic media content to be played back at the second recommended volume level, the first recommended volume level comprising an increase in volume level of the computer device during the first scene and the second recommended volume level comprising a decrease in the volume level of the computing device during the second scene.

2. A computer-implemented method, comprising:
receiving a request for electronic media content from a computing device associated with a particular user;
retrieving historical volume adjustments, made by one or more other users, that are associated with the requested electronic media;

parsing the electronic media content into a plurality of segments based at least in part on an image recognition analysis of image data of the electronic media content, the plurality of segments including at least a first scene and a second scene, the first scene determined to correspond to a quiet scene based at least in part on the image recognition analysis of the image data and the second scene determined to correspond to an unquiet scene based at least in part on the image recognition analysis of the image data;

generating a first normalized volume level for the first scene and a second normalized volume level for the second scene of the plurality of segments of the electronic media content by aggregating the historical volume adjustments in the corresponding segments when the historical volume adjustments include a number of volume adjustments to the first scene and to the second scene that are above a predetermined threshold;

providing a first recommended volume level and a second recommended volume level to the computing device associated with the particular user, the first recommended volume level and the second recommended volume level determined based at least in part upon the first normalized volume level for the first scene and the second normalized volume level for the second scene, and further in part on historical volume adjustments, by the user, for content similar to the first scene and the second scene; and causing the first scene of the plurality of segments of the electronic media content to be played back at the first recommended volume level and the second scene of the plurality of segments of the electronic media content to be played back at the second recommended volume level, the first recommended volume level comprising an increase in volume level of the computer device during the first scene and the second recommended volume level comprising a decrease in the volume level of the computing device during the second scene.

3. The computer-implemented method of claim 2, further comprising:

analyzing a user profile of the user and audio system of the computing device; and providing the first recommended volume level or the second recommended volume level to the computing device, the first recommended volume level or the second recommended volume level determined based at least in part upon at least one of the normalized volume level for the at least one segment, the user profile, and the audio system of the computing device.

4. The computer-implemented method of claim 3, wherein the user profile includes one or more of viewing history, purchase and rental history, user preference, and user demographic data.

5. The computer-implemented method of claim 3, wherein the audio system includes one or more of a headphone, a tablet speaker, a blue tooth speaker, a computer speaker, a bookshelf speaker, a center-channel speaker, a floor speaker, an in-wall and in-ceiling speaker, an outdoor speaker, a sound bar, a portable speaker, a woofer/subwoofer speaker, or an audio amplifier.

6. The computer-implemented method of claim 3, further comprising:

classifying users of the electronic media content into a plurality of user segments based on user volume adjustments made while watching electronic media contents;

determining normalized volume levels for other segments of the plurality of segments of the electronic media content by aggregating historical volume adjustments, made by users in the same user segment as the particular user, in the corresponding segment of the electronic media content; and providing the first recommended volume level and the second recommended volume level to the computing device, the first recommended volume level and the second recommended volume level determined based at least in part upon one of the normalized volume level in the corresponding segment, the historical volume adjustments made by users in the same user segment as the particular user, and the audio system of the computing device.

7. The computer-implemented method of claim 6, further comprising:

in response to a determination that the user belongs to a specific user segment of users that require hearing aid, causing audio setting on the computing device to be tuned to a frequency corresponding to a frequency of the hearing aid.

8. The computer-implemented method of claim 6, further comprising:

in response to a determination that the user belongs to a specific user segment of users that require hearing aid, causing subtitles to be automatically displayed on the computing device of the user.

9. A non-transitory computer-readable storage medium including instructions that, when executed by at least one processor of a computing system, cause the computing system to:

receive a request for electronic media content from a computing device associated with a particular user;

retrieve historical volume adjustments, made by one or more other users, that are associated with the requested electronic media;

parse the electronic media content into a plurality of segments based at least in part on an image recognition analysis of image data of the electronic media content, the plurality of segments including at least a first scene and a second scene, the first scene determined to correspond to a quiet scene based at least in part on the image recognition analysis of the image data and the second scene determined to correspond to an unquiet scene based at least in part on the image recognition analysis of the image data;

generate a first normalized volume level for the first scene and a second normalized volume level for the second scene of the plurality of segments of the electronic media content by aggregating the historical volume adjustments in the corresponding segments when the historical volume adjustments include a number of volume adjustments to the first scene and to the second scene that are above a predetermined threshold;

provide a first recommended volume level and a second recommended volume level to the computing device associated with the particular user, the first recommended volume level and the second recommended volume level determined based at least in part upon the first normalized volume level for the first scene and the second normalized volume level for the second scene, and further in part on historical volume adjustments, by the user, for content similar to the first scene and the second scene; and cause the first scene of the plurality of segments of the electronic media content to be played back at the first recommended volume level and the second scene of the plurality of segments of the electronic media content to be played back at the second recommended volume level, the first recommended volume level comprising an increase in volume level of the computer device during the first scene and the second recommended volume level comprising a decrease in the volume level of the computing device during the second scene.

10. The non-transitory computer-readable storage medium of claim 9, wherein the instructions when executed further cause the system to:
   cause the electronic media content to be played back at the volume no more than a decibel cap.

11. The non-transitory computer-readable storage medium of claim 10, wherein the instructions when executed further cause the system to:
   in response to the user switching to a new audio system on the computing device, cause the recommended volume level and the decibel cap to be automatically adjusted based at least in part upon the new audio system.

* * * * *